Aug. 4, 1936. E. G. HILL 2,049,739
CLUTCH CONTROL DEVICE FOR MOTOR VEHICLES
Filed March 19, 1932 2 Sheets-Sheet 2
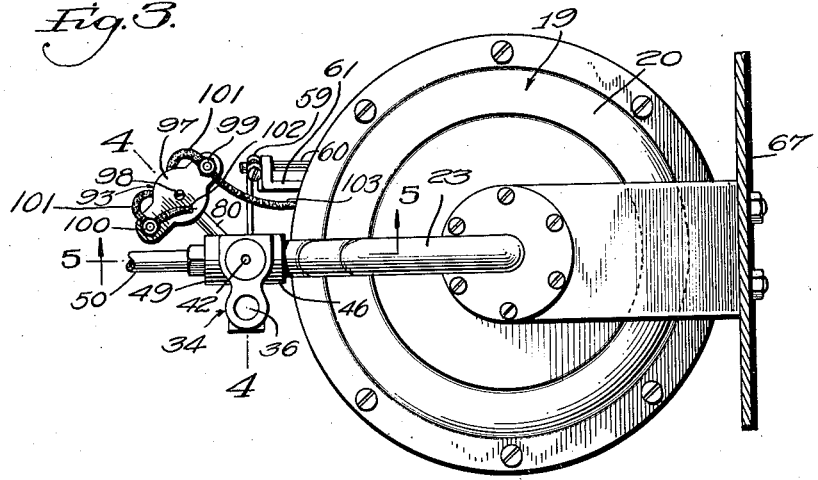
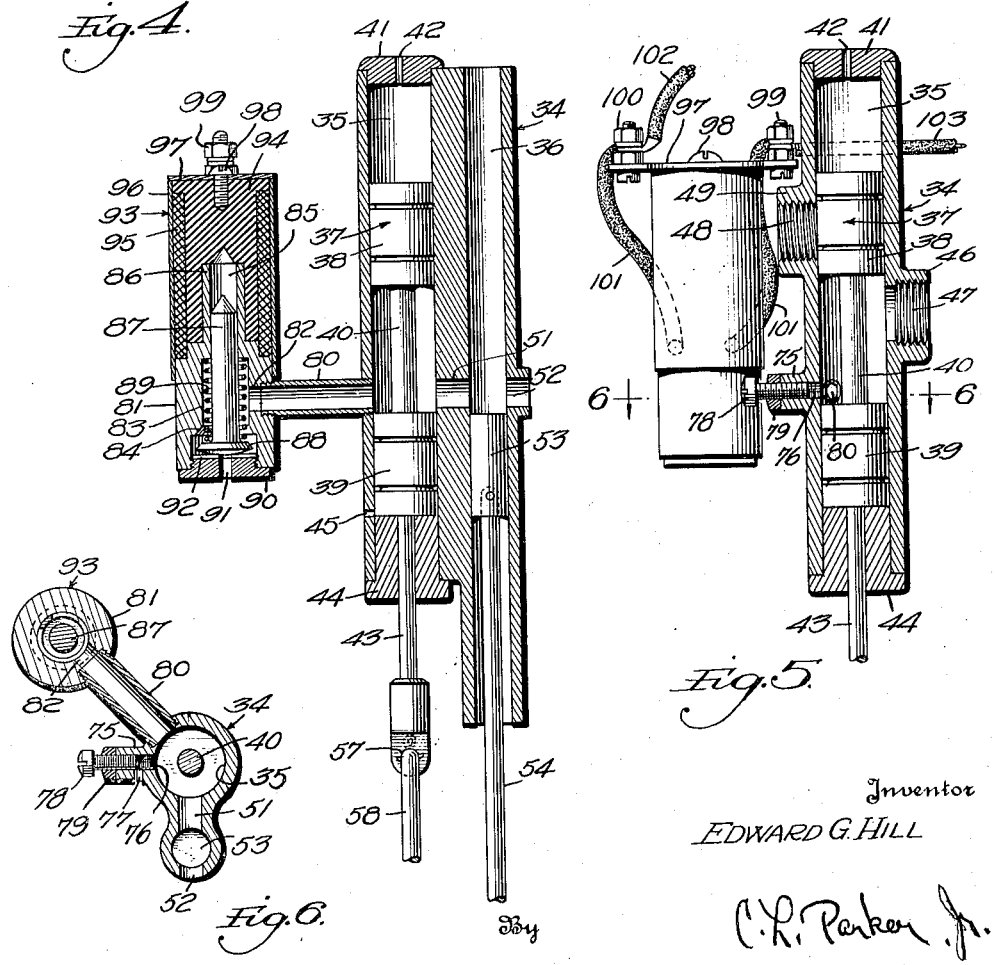
Inventor
EDWARD G. HILL
By C. L. Parker Jr.
Attorney Patented Aug. 4, 1936

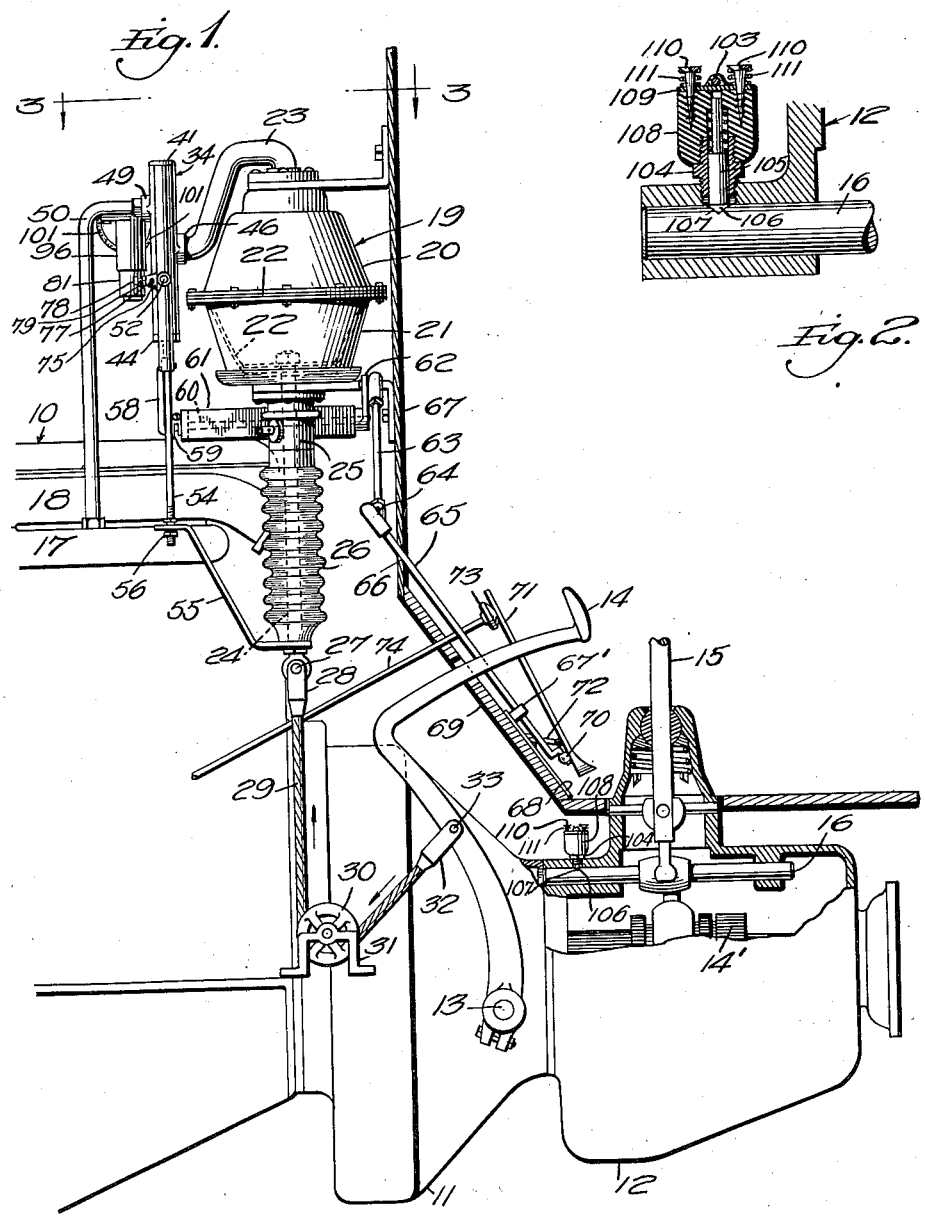

2,049,739

UNITED STATES PATENT OFFICE 2,049,739

CLUTCH CONTROL DEVICE FOR MOTOR VEHICLES

Edward G. Hill, Richmond, Va., assignor to Hill Engineering Corporation, Richmond, Va., a corporation of Virginia Application March 19, 1932, Serial No. 600,019

21 Claims. (Cl. 192—.01)

This invention relates to clutch control devices for motor vehicles.

In my copending applications Serial Nos. 480,598 for Clutch operating devices for motor vehicles, filed September 8th, 1930, and 487,319 for Clutch operating mechanism for motor vehicles, filed October 9, 1930, I have disclosed devices operable for controlling the clutches of motor vehicles wherein differential pressure is utilized for effecting movement of the clutch to inoperative position and is released for permitting the clutch springs to return the clutch elements to operative position, and wherein movement of the clutch elements as they come into contact with each other is retarded to prevent the clutch from "grabbing".

The devices of the copending applications referred to were found to be fully practical and operative but it was found advisable to provide some means whereby the movement of the clutch elements into engagement with each other would be retarded to a less degree when the vehicle is in second and high gears. The desirability for such operation lies in the fact that it is necessary to permit the clutch elements to come into engagement relatively slowly when the vehicle is in low gear and is started from a standstill, whereas faster clutch operation is practicable in second and high gears whereby the complete operation of shifting gears is permitted to take place relatively rapidly. To this end, the copending applications of Edward G. Hill and Henry W. Hey, Serial Nos. 578,394 for Clutch operating devices for motor vehicles, filed December 1, 1931, and 587,578, for Clutch control devices for motor vehicles, filed January 19, 1932, disclosed means whereby the speed of engagement of the clutch elements is permitted to take place automatically in accordance with the gear shift position and the consequent manner of operating the accelerator. The present invention, as in the cases of the copending applications of Edward G. Hill and Henry W. Hey has for its principal object the provision of means associated with a clutch control device for determining the speed of engagement of the clutch elements in accordance with the position of the gear shift.

More specifically, the invention relates to differential pressure operated clutch control devices wherein differential pressure is established in a suitable device for effecting disengagement of the clutch elements and is progressively reestablished for permitting the clutch elements to become engaged, and wherein the speed of reestablishment of pressure equalization and the consequent speed of engagement of the elements of the clutch is determined by the position of the gear shift lever.

A further object is to provide a plurality of bleed ports operative for reestablishing pressure equalization of the differential pressure operated device to permit the clutch elements to return to operative position in engagement with each other, and to provide means operative in accordance with the position of the gear shift lever for determining the operation of at least one of the bleed ports to determine the rate of movement of the clutch elements into engagement with each other.

A further object is to provide normally operative bleed means operative upon return to normal position of the main control valve of the differential pressure device for reestablishing pressure equalization in such device and to provide means operative when the gear shift lever is in low speed or reverse position for reducing the rate of pressure equalization through said bleed means.

A further object is to provide a fixed bleed port operative for reestablishing pressure equalization in the differential pressure device, and a valve controlled bleed port, normally open and adapted to be closed when the vehicle is in reverse or low gear to reduce the rate of pressure equalization in the differential pressure device and thus reduce the speed of engagement of the clutch elements.

Other objects and advantages of the invention will become apparent during the course of the following description.

In the drawings I have shown one embodiment of the invention. In this showing,

Figure 1 is a side elevation of the apparatus shown applied to parts of a motor vehicle, portions of the latter being shown in section and parts being broken away, Figure 2 is an enlarged sectional view of a portion of the gear set showing the shift rod controlled switch, Figure 3 is a section on line 3—3 of Figure 1, parts being omitted, Figure 4 is a section taken substantially on line 4—4 of Figure 3, Figure 5 is a similar view on line 5—5 of Figure 3, the piping connections being omitted, and, Figure 6 is a section on line 6—6 of Figure 5.

Referring to Figure 1, the numeral 10 designates a motor vehicle engine associated with the usual clutch 11 and gear set 12. The elements of the clutch (not shown) may be conventional, and are controlled by a rock shaft 13 to which is connected the usual pedal 14. The gear set also may be conventional and is provided with the usual gears indicated as a whole by the numeral 14' and controlled by operation of a shift lever 15. Movement of this lever effects gear operation through any suitable means such as the usual shift rods one of which is illustrated in Figure 1 and designated by the numeral 16. The shift rod 16 illustrated is the low gear and reverse rod, and will be referred to later. The vehicle motor, as shown in Figure 1, is provided with the usual intake manifold 17 and exhaust manifold 18. The elements described are conventional and form no part of the present invention except in the combination claimed.

Referring to Figures 1 and 3, the numeral 19 designates a power source as a whole operative in a manner to be described for controlling movement of the clutch pedal 13. This power source is of the differential pressure type and may be identical with the corresponding device illustrated in each of the copending applications above referred to, and need not be specifically described. It is preferred that the power device be operated by the suction present in the intake manifold of the vehicle, and for this purpose the power device includes upper and lower casing sections 20 and 21 having a diaphragm 22 secured at its peripheral edges therebetween. (The upper casing section communicates with one end of a conduit 23 by means of which the upper casing section is adapted to be connected to the intake manifold in a manner to be described.

The diaphragm 22 is connected in any suitable manner to the upper end of a reciprocating rod 24 operating in a bearing 25 carried by the lower casing section 21. A longitudinally extensible sleeve 26 may surround the rod 24 to protect it against the collection of dust and other foreign material. When this sleeve is employed, it may be connected at its upper end to the bearing 25 and at its lower end to the rod 24 at a point near the lower end thereof. The lower end of the rod 24 is pivotally connected as at 27 to a yoke 28, and this yoke, in turn, is secured to one end of a cable 29. The cable passes around a pulley 30 rotatable in a bracket 31, and this bracket is supported by any suitable relatively stationary part of the vehicle such as the frame thereof. The other end of the cable is connected to a yoke 32, and this yoke is pivotally connected as at 33 to the clutch pedal 14.

Suitable means are provided for controlling the diaphragm 22. The numeral 34 designates a valve casing as a whole which is preferably formed integral and is provided with a pair of cylindrical valve chambers 35 and 36. A valve indicated as a whole by the numeral 37 is reciprocable in the chamber 35 and includes upper and lower heads 38 and 39 connected by a reduced shank 40. The upper end of the chamber 35 is provided with a cap 41 having a vent opening 42 therein. The lower head 39 is connected to an operating rod 43 reciprocable in a lower bearing 44 forming a head for the lower end of the chamber 35. The lower end of this chamber is provided with a vent opening 45, as shown in Figure 4.

The operation of the valve 37 controls connection between the upper casing section 20 and the intake manifold 17. The valve body 34 is provided at one side with an outstanding boss 46 having a port 47 threaded for connection with the conduit 23. The valve 37 normally occupies the position shown in Figures 4 and 5 with the port 47 arranged between the valve heads 38 and 39. The valve head 38 normally covers the port 48 extending into the chamber 35 through a boss 49 and the port 48 is connected to one end of a conduit 50. The opposite end of this conduit is connected to the intake manifold 17 as shown in Figure 1.

A port 51 affords communication between the chambers 35 and 36 just above the valve head 39 when the latter is in normal position. This port is formed preferably by drilling an opening from the outside of the valve housing, thus forming a second port 52 in alinement with the port 51, although it will be apparent that the port 51 normally communicates with the atmosphere through the open upper end of the valve chamber 36. A valve 53 is mounted to reciprocate in the chamber 36 to open and close the port 51 in a manner and for a purpose to be described. The valve 53 is actuated by a rod 54, to the upper end of which it is connected, and the lower end of the valve rod is connected to the outer end of an arm 55. The inner end of this arm is connected to the reciprocating rod 24 to move vertically therewith. The connection between the rod 54 and arm 55 is effected by means of nuts 56 threaded on the rod 54 whereby the latter, together with the valve 53, may be vertically adjusted with respect to the arm 55.

Any suitable means may be employed for effecting operation of the valve 37. In the present instance, the valve stem 43 is shown as having its lower end connected as at 57 with one end of a link 58, and the other end of this link is connected to a crank 59 carried by a rock shaft 60 journalled in opposite ends of a bracket 61. The other end of the rock shaft 60 is provided with a crank 62 having its end connected to a link 63, and movement is imparted to this link by a crank 64 connected to a rock shaft 65. The rock shaft 65 extends through a suitable opening 66 formed in the dash 67 of the vehicle, this opening acting as a bearing for one end of the rock shaft. The other end of the rock shaft is supported in a small bearing 67' carried by a plate 68 secured to the floor board 69 of the vehicle. The lower end of the rock shaft is offset to form a crank provided with a roller 70. A treadle 71 is depressible at its lower end to rock the shaft 65 by pressing downwardly on the roller 70. To permit this action of the treadle to take place, the treadle is pivotally connected to one end of a hinge link 72 and the other end of this link is pivotally connected to the plate 68. Suitable spring means (not shown) may be connected to any portion of the operating means for the valve 37 to maintain this element in normal position and to maintain the treadle 71 normally in its upper position, as shown in Figure 1.

The upper end of the treadle 71 operates against the accelerator button 73 mounted on the upper end of an accelerator rod 74. This rod may be connected by any suitable means to the throttle of the vehicle. It will be apparent that the upper end of the treadle 71 is adapted to move independently of the lower end of the treadle whereby throttle operation throughout its range of movement is adapted to take place without rocking the shaft 65, while this shaft is adapted to be rocked when the accelerator button 73 is released. In other words, the treadle 71 merely forms a common operating device for the shaft 65 and button 73, and operation of these elements is wholly independent of each other and may take place either separately or simultaneously. The arrangement of the treadle and its connection with the throttle and control valve 37 are shown in the copending applications Serial Nos. 578,394 and 587,578 referred to above.

Means are provided for controlling the return movement of the clutch elements into operative engagement by controlling the manner and rate of reestablishment of pressure equalization in the power device 19. Referring to Figures 5 and 6, the numeral 75 designates a boss cast on the valve housing 34 and provided with a threaded opening 76 therethrough forming a port. An opening 77, forming a bleed port, is drilled through the boss 75 and communicates between the atmosphere and the port 76. A screw 78 is threaded in the opening or port 76 to regulate the extent to which the port 77 is uncovered, and the screw is adapted to be maintained in adjusted positions by a lock nut 79. Adjustment of the screw regulates the rate of flow of air through the port 77 into the valve chamber 35 and is uncontrolled by any means other than the valve head 39, which covers the port 76 when the valve is moved upwardly and uncovers the port upon downward movement of the valve.

The port 76 is preferably arranged substantially in the plane of the port 51, transversely of the valve chamber 35, and in substantially the same plane, a small pipe 80 is tapped through the wall of the chamber 35 to communicate therewith. The outer end of the pipe 80 is tapped into a valve body 81, preferably formed of brass or other non-magnetic material, and the interior of the pipe 80 communicates through a port 82 with an axial chamber 83 in the valve body 81. The lower end of the axial opening 83 is provided with a valve seat 84.

The upper end of the valve body 81 is provided with an axial guide 85 extending upwardly through an axial extension 86 formed on the upper end of the valve body 81. A valve stem 87 operates in the guide 85 and is provided at its lower end with a valve 88 movable upwardly into engagement with the seat 84. A light spring 89 normally holds the valve 88 in lower position. A lower head 90 is threaded in the lower end of the valve body 81 and is provided with an axial port 91 communicating with radial grooves 92 formed in the upper face of the plug or head 90.

A solenoid indicated as a whole by the numeral 93 is arranged on the upper end of the valve body 81. As shown, the solenoid includes a magnetizable core 94 surrounded by a winding 95, and this winding is protected by an insulating covering 96. An insulating cap 97 is secured to the upper end of the core 94 by a screw 98 and projects on opposite sides of the solenoid to support binding posts 99 and 100. The binding posts are connected to the ends of the coil of the solenoid by wires 101. One of the binding posts, such as the post 100 is connected by a wire 102 to one post of the battery of the vehicle, while the other binding post is connected to one end of a wire 103 leading to a switch to be described.

Referring to Figure 2, the numeral 104 designates a plug threaded at its lower end in a portion of the gear set and forming a bearing for a small reciprocating plunger 105. The lower end of this plunger is V-shaped as at 106 and engages in a similarly shaped notch 107 formed in the shift rod 16. It will be apparent that slight movement of the shift rod to place the gear set in low gear or reverse forces the lower end of the plunger 105 out of the notch 107, thus transmitting vertical movement to the plunger. The upper end of the plug 104 is threaded in the insulating body 108 on the upper end of which is arranged a metal cap 109. This cap is held in normal position by screws 110 and by springs 111 arranged between the heads of the screws and the upper face of the plate 109. The other end of the wire 103 is soldered or otherwise secured to the plate 109. The upper end of the plunger 105 is movable into engagement with the plate 109 upon upward movement imparted to the plunger by movement of the shift rod 16. The other post of the battery of the vehicle is grounded in the usual manner as is the plunger 105, the latter being electrically connected to the casing of the gear set.

The operation of the apparatus is as follows:

The various valve devices normally occupy the positions illustrated, and accordingly it will be apparent that the upper valve head 38 covers the port 48 and thus prevents communication between the upper diaphragm casing 20 and the intake manifold. At the same time, the upper diaphragm casing communicates with the atmosphere through pipe 23, port 47, the space around the shank 40, and the port 51. The lower casing section 21 is always in communication with the atmosphere through a suitable atmospheric port, and under normal conditions, therefore, the pressure is equalized on opposite sides of the diaphragm 22, and accordingly the usual springs of the clutch operate to retain the elements of the clutch in engagement with each other.

Assuming that the vehicle is at a standstill with the engine running, and the operator desires to start the vehicle, it is first necessary to depress the lower end of the treadle 71, and this action takes place instead of operating the clutch pedal in the usual manner. Depression of the lower end of the treadle 71 takes place without affecting the accelerator button 73, and the rod 65 will be rocked through the depression of the roller 70. When the shaft 65 is rocked, it exerts a downward pull on the link 63, whereupon the shaft 60 will be rocked to move the link 58 upwardly and thus shift the valve 37 to its upper position. When the valve assumes such upper or operative position, the lower valve head 39 covers the ports 51 and 76 and the inner end of the pipe 80, while the upper valve head 38 uncovers the port 48, and thus communication will be established between the intake manifold and the upper diaphragm casing 20 through pipes 23 and 50 and their associated valve ports 47 and 48. Thus air will be exhausted from the upper diaphragm casing and a pressure differential will be established on opposite sides of the diaphragm, thus causing the latter element to move upwardly. This movement is transmitted to the shaft or rod 24, thus exerting a pull on the cable 29, which is transmitted to the clutch pedal 14 to move the clutch elements to inoperative position.

With the clutch elements thus disengaged, the operator moves the gear shift lever 15 to place the vehicle in low gear. This movement causes forward sliding movement of the shift rod 16, whereupon the plunger 105 will be moved upwardly and the upper end of the plunger will contact with the plate 109. This action closes the circuit through the solenoid winding 95 to move the valve stem 87 upwardly, this element acting as the armature of the solenoid. In this connection, it will be noted that one terminal of the vehicle battery is grounded, and the circuit will be completed from the battery ground to the plunger 105, through plate 109, wire 103, the winding of the solenoid, and thence to the battery through wire 102. Such circuit will remain closed so long as the gear shift lever remains in low gear position. It also will be apparent that the placing of the gear shift lever in reverse accomplishes the same result, the shift rod 16 merely being moved rearwardly. In other words, when the vehicle is started from a standstill, the gear shift lever will be placed either in reverse or low gear, in either of which cases the circuit to the solenoid winding will be closed, and the valve stem 87 moved upwardly. Under such conditions, it will be apparent that the valve 88 will be held closed by the solenoid during the time at which the vehicle is in low gear or in reverse. Thus air will be prevented under such conditions from flowing through the port 91 into the pipe 80.

After the vehicle has been placed in low gear in the manner referred to, the operator releases the lower end of the treadle 71 and presses the upper end of the treadle to progressively open the throttle of the vehicle. The releasing of the lower end of the treadle permits the valve 37 to return to the normal position shown in Figures 4 and 5, in which position the upper valve head 38 will close the intake manifold port 48, and the upper diaphragm casing 20 will be disconnected from the manifold. At the same time, the upper diaphragm casing will be connected to the atmosphere through pipe 23, port 47 and the port 51. In this connection, it will be noted that the valve stem 54 is connected to the arm 55, and whenever the clutch is disengaged in the manner previously described, the valve 53 will be moved from its normal position shown in Figure 4 to its operative position wholly above the port 51. This port is of substantial area, and when the control valve 37 is returned to normal position, air will rush into the upper casing section to tend to establish pressure equalization on opposite sides of the diaphragm, whereupon the diaphragm drops very rapidly due to the tendency of the clutch springs to return the elements of the clutch to normal position.

It will be apparent that the sudden movement of the clutch elements toward normal position is transmitted to the cable 29, rod 24 and diaphragm 22, and upon downward movement of the rod 24, such movement will be transmitted to the valve 53 through the arm 55 and rod 54. As soon as the valve 53 covers the port 51, further movement of the clutch elements will be retarded since the rush of air into the upper diaphragm casing will be arrested. The device is so adjusted that the sudden retarding of the movement of the clutch elements takes place just before they come into engagement with each other. As previously stated, the releasing of the lower end of the treadle takes place substantially simultaneously with the depression of the upper end of the treadle, whereby the speed of the vehicle motor will be increased through the opening of the throttle. After the rapid movement of the clutch elements has been retarded pressure equalization on opposite sides of the diaphragm will take place relatively slowly due to the flow of air into the upper diaphragm casing through the ports 76 and 77, through the space around the shank 40, and through the port 47 and pipe 23. As the vehicle engine is accelerated, therefore, the clutch elements will move slowly into engagement with each other without any grabbing action. The rate of movement of the clutch elements into engagement readily may be controlled by adjustment of the screw 78 which controls the area of the bleed port 77.

After the vehicle has gained sufficient momentum in low gear, the upper end of the treadle 71 is released to permit the engine to drop to idling speed, while the lower end of the treadle again will be depressed to move the valve 37 to operative position and disengage the clutch in the manner previously stated. The driver of the vehicle then places the gear shift lever in second gear, whereupon the lower end of the treadle is released while the upper end is substantially simultaneously depressed to accelerate the vehicle motor. As is well known, it is necessary to permit the elements of a vehicle clutch to come very gradually into engagement with each other when the vehicle is in low gear and is being started from a standstill, but after the vehicle gains considerable momentum, the clutch elements may be permitted to move relatively rapidly into engagement without grabbing. The use of the solenoid operated valve minimizes the rate of reestablishment of pressure equalization in the diaphragm chamber to retard the movement of the clutch elements into engagement with each other, but the solenoid valve does not function in second and high gears, since the plunger 105 is operative only in connection with the shift rod 16 associated with reverse and low gears. Accordingly, when the vehicle is shifted into second or high gear, the solenoid will remain deenergized with the valve 88 in open position, and when the valve 37 is released while the accelerator is being depressed, air not only will flow into the diaphragm casing through ports 76 and 77, but also through the pipe 80, and thus the clutch elements will move into engagement somewhat more rapidly than when in low or reverse gear. Thus the time necessary for passing through all three gears is greatly minimized since it is unnecessary for the operator to slowly depress the accelerator in synchronism with the slow movement of the clutch elements into engagement with each other which takes place when the bleeding action is effected only through the small port 77.

From the foregoing, it will be apparent that the present apparatus provides means whereby clutch disengagement may be effected with the expenditure of very little manual effort, while the return movement of the clutch elements takes place automatically and at the proper speed in accordance with the position of the gear shift lever. In other words, when a vehicle is at a standstill, clutch element engagement takes place quite slowly as the accelerator is depressed, and takes place more rapidly when the vehicle is in second or high gear to minimize the time necessary for going through the gears when starting the vehicle. In either case, the clutch elements return very rapidly from fully disengaged position to the position at which they are about to become engaged whereupon their movement is sufficiently retarded to prevent any grabbing action. This sudden movement of the clutch elements also minimizes the time necessary for going through the gears, while the controlling of the rate of movement of the clutch elements into actual engagement in accordance with the position of the gear shift lever also permits operation of the vehicle without any grabbing action occurring in the clutch.

Movement of air through the pipe 80 takes place through the port 91, slots 92 and chamber 83, and if desired, any suitable means may be employed for governing the rate of movement of the air. The adjusting screw 78, however, provides all of the adjustment necessary since air flows into the diaphragm casing through the ports 76 and 80 at the same time when the vehicle is in second and high gear and through the port 76 alone when the vehicle is in low gear and accordingly adjustment of the port 77 controls the rate of bleeding of the air under all conditions.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a power device connected to an operating member of a motor vehicle clutch, a control device operable for rendering said power device operative to move the clutch to inoperative position, automatic means operative as the clutch elements approach operative position for retarding the movement of such elements, and means connected to the gear set of the vehicle and operative after movement of the clutch elements has been retarded by said last named means for controlling the rate of movement of the clutch elements into engagement with each other in accordance with the position of the gears in the gear set.

2. Apparatus of the character described comprising a fluid pressure power device connected to an operating member of a motor vehicle clutch, a control device operable for establishing a pressure differential in said power device for rendering it operative to move the clutch to inoperative position, automatic means operative as the clutch elements approach operative position for retarding the movement of such elements, and means connected to the gear set of the vehicle and operative after movement of the clutch elements has been retarded for determining the rate of reestablishment of pressure equalization in the power device to control the rate of movement of the clutch elements into engagement with each other in accordance with the position of the gears in the gear set.

3. Apparatus of the character described comprising a differential pressure power device having a movable member connected to a motor vehicle clutch, an operating valve normally operative for establishing pressure equalization in the power device and operable for establishing differential pressure therein, automatic means operative after the return of the operating valve to normal position for retarding the movement of the clutch elements as they approach operative position, and control valve mechanism connected to the gear set of the vehicle and operative after movement of the clutch elements has been retarded for determining the rate of reestablishment of pressure equalization in the power device to control the rate of movement of the clutch elements into engagement with each other.

4. Apparatus of the character described comprising a suction operated power device having a movable member connected to a motor vehicle clutch, an operating valve normally operative for establishing pressure equalization in said power device and operable for connecting the power device to a source of suction, fixed bleed means operative upon return of the operating valve to normal position for connecting the power device to the atmosphere, an automatic bleed valve operative when the operating valve is in normal position for connecting the power device to the atmosphere, and means automatically operative when the gears of the gear set are in at least one position for closing said bleed valve.

5. Apparatus constructed in accordance with claim 4 wherein the means for closing said bleed valve comprises a solenoid, an armature for the solenoid connected to the bleed valve, and means operative for closing the circuit through the solenoid when the gears in the gear set are moved to at least one selected position.

6. Apparatus of the character described comprising a suction operated power device having a movable member connected to a motor vehicle clutch, an operating valve normally operative for establishing pressure equalization in said power device and operable for connecting the power device to a source of suction, automatic means operative as the elements of the clutch approach operative position for at least partially disconnecting the power device from the atmosphere to retard the movement of the clutch elements, fixed bleed means operative after movement of the clutch elements has been retarded for affording limited communication between the power device and the atmosphere, a bleed valve for affording additional limited communication between the power device and the atmosphere after the movement of the clutch elements has been retarded, and means automatically operative when the gears of the gear set are in at least one position for closing said bleed valve.

7. Apparatus constructed in accordance with claim 6 wherein the means for closing said bleed valve comprises a solenoid, an armature for the solenoid connected to the bleed valve, and means operative for closing the circuit through the solenoid when the gears in the gear set are moved to at least one selected position.

8. Apparatus of the character described comprising a power device connected to an operating member of a motor vehicle clutch, a device operable for rendering said power device operative to move the clutch to inoperative position, means operative as the clutch elements approach operative position for retarding the return movement of the clutch elements into engagement with each other, a member engageable with the low and reverse gear shift rod of the gear set of the vehicle and adapted to be actuated thereby when the gear set is placed in low or reverse gear, and means operative upon actuation of said member and controlling the power device for further retarding the rate of movement of the clutch elements into engagement with each other.

9. Apparatus of the character described comprising a suction operated power device having a movable member connected to a motor vehicle clutch, an operating valve normally operative for establishing pressure equalization in said power device and operable for connecting the power device to a source of suction, fixed bleed means operative upon return of the operating valve to normal position for connecting the power device to the atmosphere, an automatic bleed valve normally operative when the operating valve is in normal position for connecting the power device to the atmosphere, a member operable by the low and reverse gear shift rod of the gear set, and means operative upon operation of said member for closing said bleed valve.

10. Apparatus of the character described comprising a suction operated power device having a movable member connected to a motor vehicle clutch, an operating valve normally operative for establishing pressure equalization in said power device and operable for connecting the power device to a source of suction, automatic means operative as the elements of the clutch approach operative position for at least partially disconnecting the power device from the atmosphere to retard the movement of the clutch elements, fixed bleed means operative after movement of the clutch elements has been retarded for affording limited communication between the power device and the atmosphere, a bleed valve for affording additional limited communication between the power device and the atmosphere after the movement of the clutch elements has been retarded, a member operative by the low and reverse gear shift rod of the gear set, and means operative upon operation of said member for closing said bleed valve.

11. In an automotive vehicle provided with an internal-combustion engine and a clutch, an engine operated power means for operating said clutch, and means for controlling the operation of said power means, including successively operable power operated valves for controlling the clutch engaging operation of said engine operated means.

12. In a vacuum operated clutch control mechanism for an automotive vehicle having an internal-combustion engine and a clutch, said mechanism including a fluid motor, connections between said motor and clutch and fluid transmitting connections between the intake manifold of said engine and said motor, said latter connections including a three-way control valve for said motor and further including a plurality of successively operable valves for controlling the mode of engagement of the clutch.

13. In a vacuum operated clutch control mechanism for an automotive vehicle having an internal-combustion engine, a throttle, an accelerator pedal, a connection between said pedal and throttle, and a clutch, said clutch control mechanism including a fluid motor, a mechanical connection between said motor and clutch and fluid transmitting connections between the intake manifold of said engine and said motor, said latter connections including an accelerator operated three-way control valve for said motor and further including control valves for determining the mode of engagement of the clutch.

14. Apparatus constructed in accordance with claim 6 wherein the means for closing said bleed valve comprises a solenoid, an armature for the solenoid connected to the bleed valve, and means connected to the low and reverse gear shift rod of the gear set for closing the circuit through the solenoid when the gears are shifted to low or reverse position.

15. In an automotive vehicle provided with an internal combustion engine and a clutch, an engine-operated power means for operating said clutch, and means for controlling the clutch engaging operation of said power means, including a sleeve having ports therein, and a main valve slidable in said sleeve and cooperating with said ports, said control means further including successively operable power-operated valves.

16. In an automotive vehicle provided with an internal combustion engine having an intake manifold and a clutch, clutch-operating power means operable by the vacuum in said intake manifold, and means for controlling the clutch engaging operation of said power means, including a sleeve having ports therein, a main valve, and a plurality of successively operable power-operated reciprocating valves, one of said valves being reciprocable in said sleeve.

17. In an automotive vehicle provided with an internal combustion engine and a clutch, an engine-operated power means for operating said clutch, and means for controlling the clutch engaging operation of said power means, including a pair of valves, one of which is provided with spaced heads providing port means therebetween, and a third valve, one of said pair of valves and said third valve being power-operated and being successively operable.

18. In an automotive vehicle provided with an internal combustion engine and a clutch, an engine-operated power means for operating said clutch, and means for controlling the clutch engaging operation of said power means, including a sleeve provided with ports, a pair of valves, one of which is slidable in said sleeve to cooperate with said ports, and one of which is provided with spaced heads providing port means therebetween, and a third valve, one of said pair of valves and said third valve being power-operated and being successively operable.

19. In a vacuum operated clutch control mechanism for an automotive vehicle having an internal combustion engine and a clutch, said mechanism including a fluid motor, connections between said motor and clutch, and fluid transmitting connections between the intake manifold of said engine and said motor, said latter connections including control means for said motor comprising a three-way valve-housing including a sleeve having ports therein, and a main valve slidable in said sleeve and cooperating with said ports, said control means further comprising successively operable valves for controlling the mode of engagement of the clutch.

20. In a vacuum operated clutch control mechanism for an automotive vehicle having an internal combustion engine and a clutch, said mechanism including a fluid motor, connections between said motor and clutch, and fluid transmitting connections between the intake manifold of said engine and said motor, said latter connections including control means for said motor comprising a three-way valve-housing, a pair of valves, one of which is provided with spaced heads providing port means therebetween, and a third valve, one of said pair of valves and said third valve being successively operable for controlling the mode of engagement of the clutch.

21. Apparatus of the character described comprising a power device connected to an operating member of a motor vehicle clutch, control mechanism operable for rendering said power device operative to move the clutch to inoperative position and for releasing the clutch for movement to operative position, said control mechanism including elements automatically operative as the clutch elements approach operative position for decelerating the movement of the clutch elements, said control mechanism further including means operative for preventing the substantial deceleration of the clutch elements as they approach operative position, and means for rendering said last named means operative in accordance with the position of the gears in the vehicle gear set.

EDWARD G. HILL.